United States Patent [19]

Jutand et al.

[11] Patent Number: 4,899,300

[45] Date of Patent: Feb. 6, 1990

[54] CIRCUIT TO PERFORM A LINEAR TRANSFORMATION ON A DIGITAL SIGNAL

[76] Inventors: Francis Jutand, 167 rue Etienne Dolet, 94230 Cachan; Nicolas Demassieux, 4 Impasse Reille, 75014 Paris; Michel Dana, 53 rue de la Colonie, 75013 Paris, all of France

[21] Appl. No.: 331,012

[22] Filed: Mar. 30, 1989

Related U.S. Application Data

[63] Continuation of Ser. No. 33,793, Apr. 3, 1987, abandoned.

[30] Foreign Application Priority Data

Apr. 4, 1986 [FR] France ................. 86 04845

[51] Int. Cl.⁴ ......................................... G06F 15/332
[52] U.S. Cl. ................................................ 364/725
[58] Field of Search ......................... 364/725, 726, 727

[56] References Cited

U.S. PATENT DOCUMENTS

| | | | |
|---|---|---|---|
| 3,581,078 | 5/1971 | Robertson | 364/827 |
| 4,080,661 | 3/1978 | Niwa | 364/726 |
| 4,106,103 | 8/1978 | Perreault | 364/726 |
| 4,385,363 | 5/1983 | Widergren et al. | 364/725 |
| 4,510,578 | 4/1985 | Miyaguchi et al. | 364/725 |
| 4,621,337 | 11/1986 | Cates et al. | 364/727 |
| 4,646,256 | 2/1987 | Bracewell | 364/725 |

FOREIGN PATENT DOCUMENTS 2316663  1/1977  France .

*Primary Examiner*—David H. Malzahn
*Attorney, Agent, or Firm*—Oblon, Spivak, McClelland, Maier & Neustadt

[57] ABSTRACT

A circuit which performs a linear transformation on a digital signal. A linear transformation is defined by a graph whose nodes represent operations of addition or subtraction and the branches operations of multiplication by a determined coefficient. According to the invention, the circuit comprises a multiplier for each branch, this multiplier being wired according to the value of the determined coefficient of said branch, and an adder for each node, each adder being wired according to the nature of the operation, addition or subtraction, associated with said node.

3 Claims, 6 Drawing Sheets

CIRCUIT TO PERFORM A LINEAR TRANSFORMATION ON A DIGITAL SIGNAL

This application is a continuation of application Ser. No. 033,793, filed on Apr. 3, 1987, now abandoned.

BACKGROUND OF THE INVENTION

1. Field of the Invention

This invention has as its object a circuit to perform a linear transformation on a digital signal composed of N digital samples, where N is a whole number. The invention is particularly applicable in the processing of digital signals, for example picture or speech signals, for the coding of these signals before they are transmitted on a transmission line.

2. Discussion of Background

In these application, various types of linear transformation are used, such as for example the discrete Fourier transform, the discrete cosine transform, the discrete sine transform, the discrete Hadamard transform, or the like. These transforms are called "discrete" with reference to the digital characteristic of the processed signal.

The linear transformation applied to a digital signal of N samples is represented traditionally by a graph in which the branches represent a multiplication operation and the nodes an addition or subtraction operation.

Such graphs are described, for a discrete cosine transformation, in the following documents:

French patent application No. 85 15649 filed on Oct. 22, 1985, now publication No. 2,589,020.

"A fast computational algorithm for the discrete cosine transform" of W. H. CHEN et al, IEEE Transactions on Communication, vol. COM-25, No. 9, Sept. 1977, pages 1004 to 009, A high FDCT processor for real-time processing of NTSC color TV signal" of A. JALALI et al, IEEE Transactions on Electromagnetic Compatibility, vol. EMC-24, No. 2, May 1982, pages 278 to 286, U.S. Pat. No. 4,385,363.

The practical embodiment of a circuit based on a linear transformation graph runs into two main problems, which are, on the one hand, the volume of the computations to be performed and, on the other hand, a flood of very complicated data between the various stages of the graph, because of the complexity of this graph.

Numerous works have already been done on simplifying the transformation algorithms, i.e., on the graphs, by reducing the number of multiplication operations to reduce the flow of data.

Actually, this reduction is desired because the multipliers are the costly elements of the circuit, both as regards their price, and their surface or their consumption. The number of multipliers is therefore reduced to a minimum by assigning to each multiplier the computations of several branches of the graph, so as to obtain a maximum rate of use of each of these multipliers.

Two types of circuit for performing a linear transformation, particularly a discrete cosine transformation or a discrete Fourier transformation are known.

A first known architecture consists in using a large number of signal processing microprocessors working in parallel. The known architecture consists in using standard multipliers and adders connected to one another. This circuit is described particularly in U.S. Pat. No. 4,385,363 already cited. For these two architectures, it involves an assembly of integrated circuits..

It has already also been proposed to make a linear transformation circuit in the form of a specific integrated circuit comprising several multipliers working in parallel. These multipliers are not specialized, i.e., between each other they can multiply any two numbers.

Circuits of the prior art exhibit the drawback of using only standard multiplying and adders, which does not make it possible to take into account the specific characteristics of the graph of the transformation that it is desired to achieve. This deviation between the architecture of the linear transformation circuits and the structure of the algorithm represented by the graph does not make it possible to optimize the processing.

SUMMARY OF THE INVENTION

The object of the invention is to eliminate the drawbacks, particularly the low performance to price ratio, of the circuits according to the prior art. This object is attained by a circuit for performing a linear transformation whose architecture is traced on that of the graph of the transformation.

In opposition to the known circuits in which the multipliers and the adders are standard circuits, able to multiply or add any two operands, in the circuit of the invention dedicated adders and multipliers are used.

More specifically, a specific multiplier corresponds to each branch of the graph of the transformation, and likewise a specific adder corresponds to each node of the graph of the transformation. Thus, each multiplier must multiply two operands one of which is fixed and represents the weight of the branch of the associated graph. Also, each adder is designed to perform only a single operation of addition or subtraction.

The invention therefore has as its object a circuit to perform a linear transformation on a digital signal composed of N samples, where N is a whole number, said circuit comprising a series of stages performing operations of addition and/or multiplication along a determined linear transformation graph, said graph comprising branches each representing an operation of multiplication between a variable operand and a determined coefficient, and nodes each representing an addition or a subtraction between two variable operands, said circuit being characterized in that it comprises a multiplier associated with each branch, this multiplier being wired according to the value of the determined coefficient associated with the branch, and an adder for each node, each adder being wired according to the nature of the operation, addition or substraction, associated with this node.

Preferably, the circuit of the invention is made in the form of a single integrated circuit.

The circuit of the invention exhibits in particular the advantage, compared with known circuits, of a superior computing power thanks to the parallelism between its architecture and the structure of the graph of the linear transformation that it performs. This also makes it possible, in an integrated version, to optimize the cost by reducing the surface and the number of circuits used, the power consumed and the cost of development. Moreover, the reliability of the circuit is improved by it.

The use of as many operators as nodes and branches of the graph makes it possible to obtain in the circuit a flood of uniform data without switching. Moreover, since each multiplier is associated with a single branch, one of its operands is constant. In the case of a discrete cosine transformation, this constant operand is a cosine or a sine. The fact that an operator is constant makes it possible for each multiplier to be specialized.

BRIEF DESCRIPTION OF THE DRAWINGS

The characteristics and advantages of the invention will come out better from the following description, given by way of illustration, but nonlimiting, with reference to the accompanying drawings in which.

DETAILED DESCRIPTION OF THE PREFERRED EMBODIMENTS

By way of example, a circuit is described that performs the discrete cosine transform in real time for an image organized in blocks of 16×16 pixels.

In a known way, the computation flow is optimized thanks to a "pipeline" type structure in which the number of maximum operations that a sample of date must undergo is minimal. Thus, the amount of storages or of buffer registers used is minimized.

French patent publication No. 2,589,020, already cited, describes the discrete cosine transformation graph for the transformation of a line or a column of 16 pixels. This graph is reproduced in FIGS. 1a, 1b and 1c.

The discrete cosine transformation circuit of a block of 16×16 pixels is made in the form of a single integrated circuit comprising, in order, the following modules:

an input register array performing the conversion of 16 pixels received in sequence and coded in parallel, into 16 pixels delivered bit by bit, in series, a computation operator of the discrete cosine transformation of a line of a block of 16×16 pixels, a storage and transposition register array which is used to store the line discrete cosine transformation coefficients of the entire block before accessing the column discrete cosine transformation computations. To do this, the various coefficients which arrive line after line must be rearranged by column. The use of a register array with horizontal and vertical shift and of input and output multiplexers makes it possible to use only a single storage array, a computation operator of the discrete cosine transformation of a column of a block of 16×16 pixels, an output register array which performs an inverse series-parallel conversion of it made by the input register array.

Figure 1A:
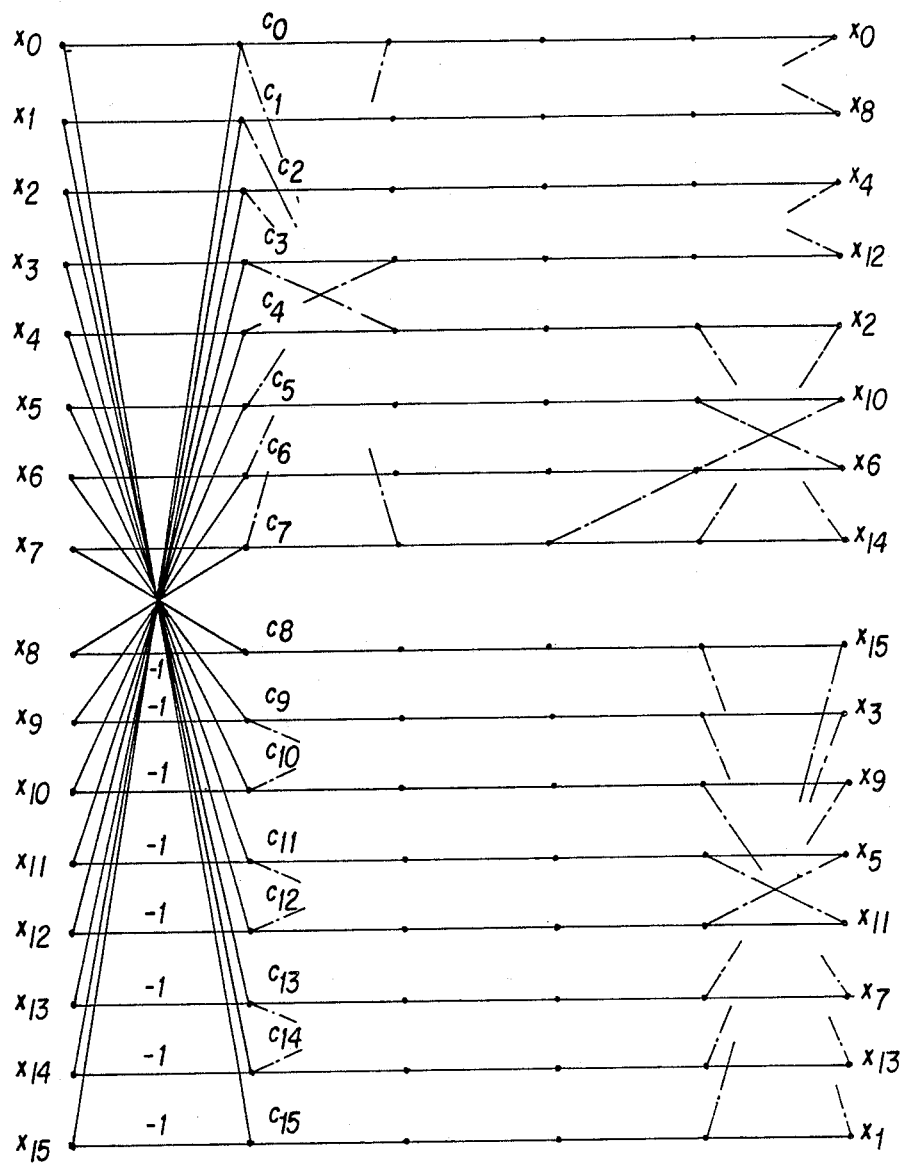
FIGS. 1a, 1b and 1c illustrate a graph of a discrete cosine transformation of size 16.
Figure 1B:
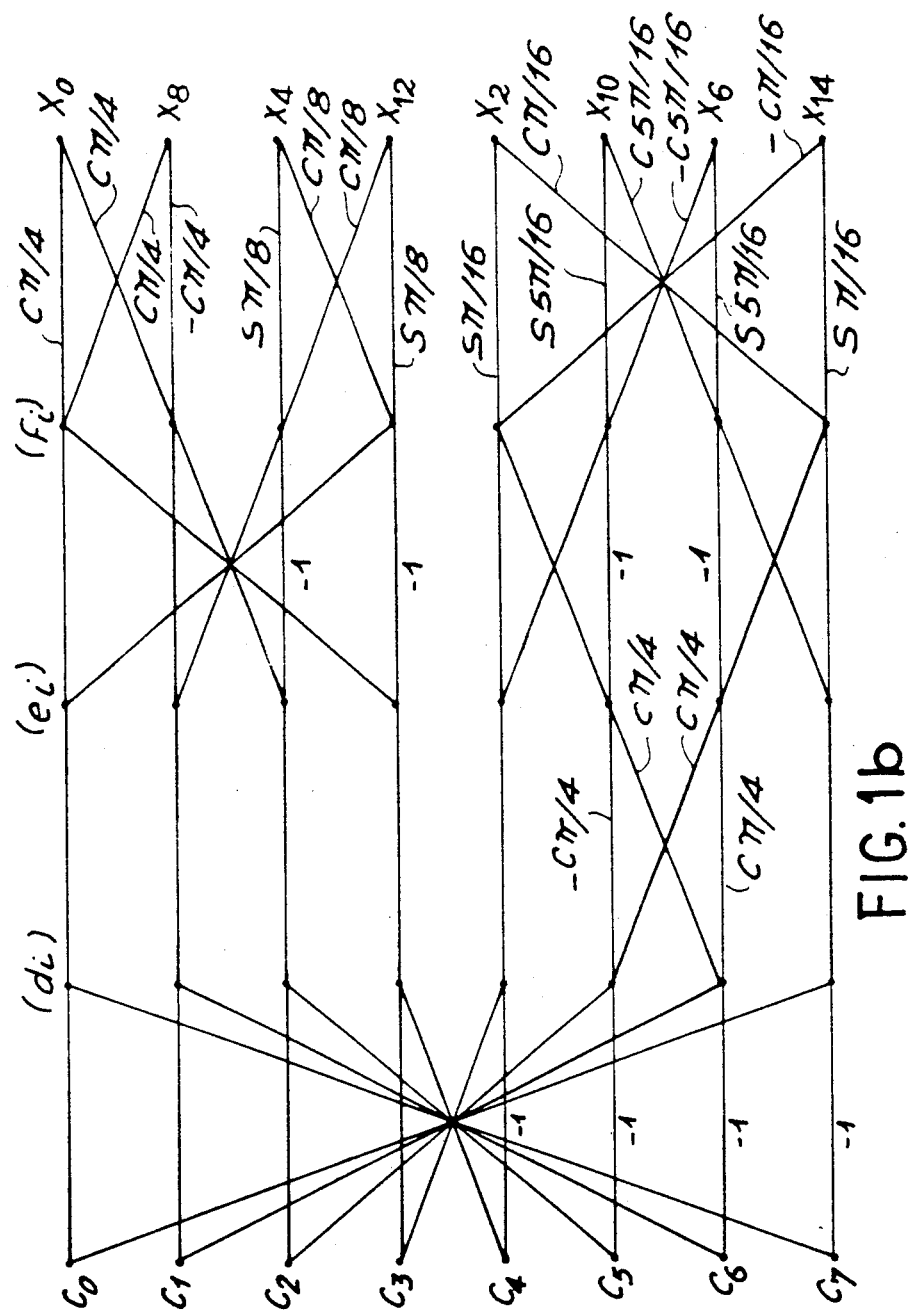
Figure 1C:
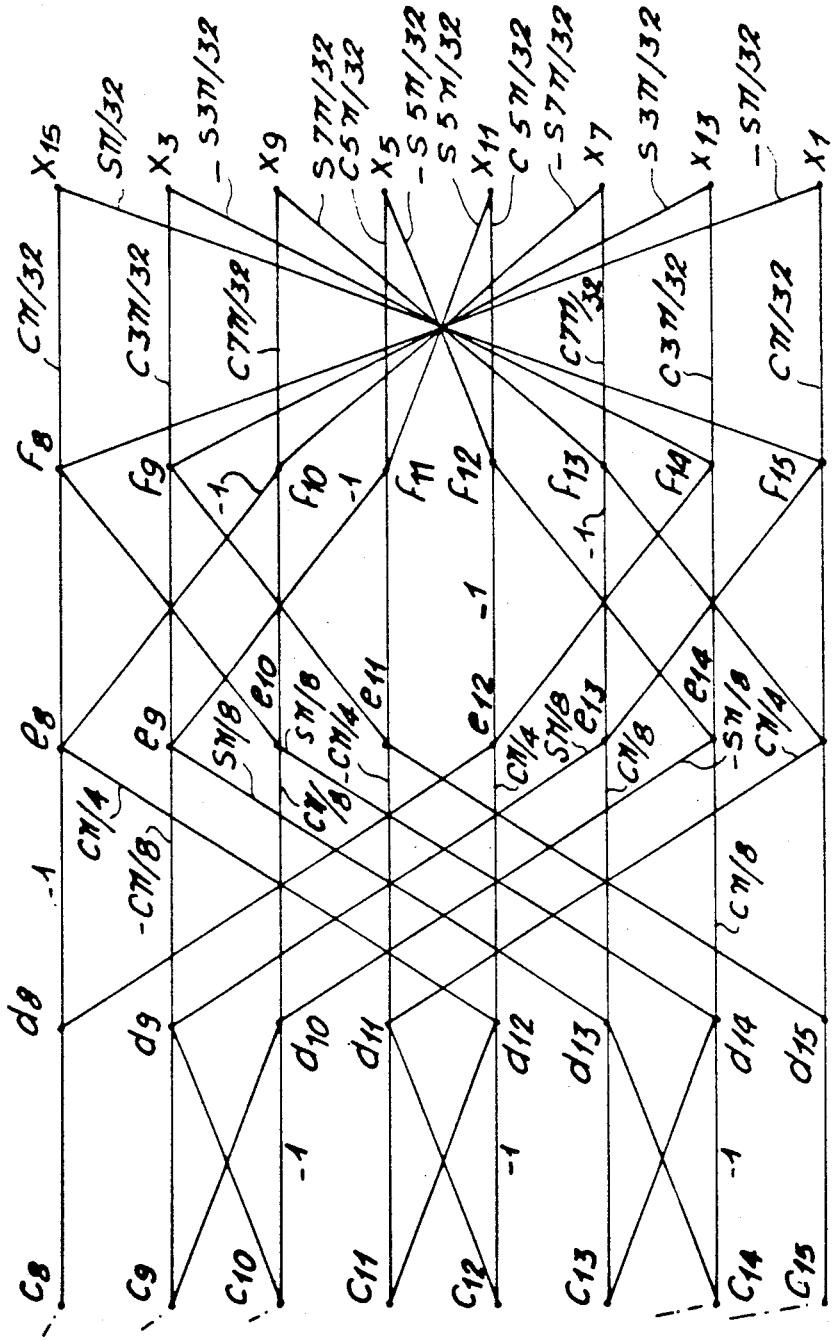

The computation operators of the discrete cosine transform of a line or of a column are each in accordance with the graph represented in FIGS. 1a, 1b, and 1c.

In this graph, each node represents an addition operation between the branches which end at this node, and each branch represents a multiplication of the number applied to the input of the branch by the coefficient associated with this branch. The coefficients designated $Ci\pi$ and $Si\pi$ correspond respectively to $\cos(i\pi)$ and $\sin(i\pi)$. French patent application No. 85 15649 can be consulted for a more detailed description of the graph.

Figure 2A:
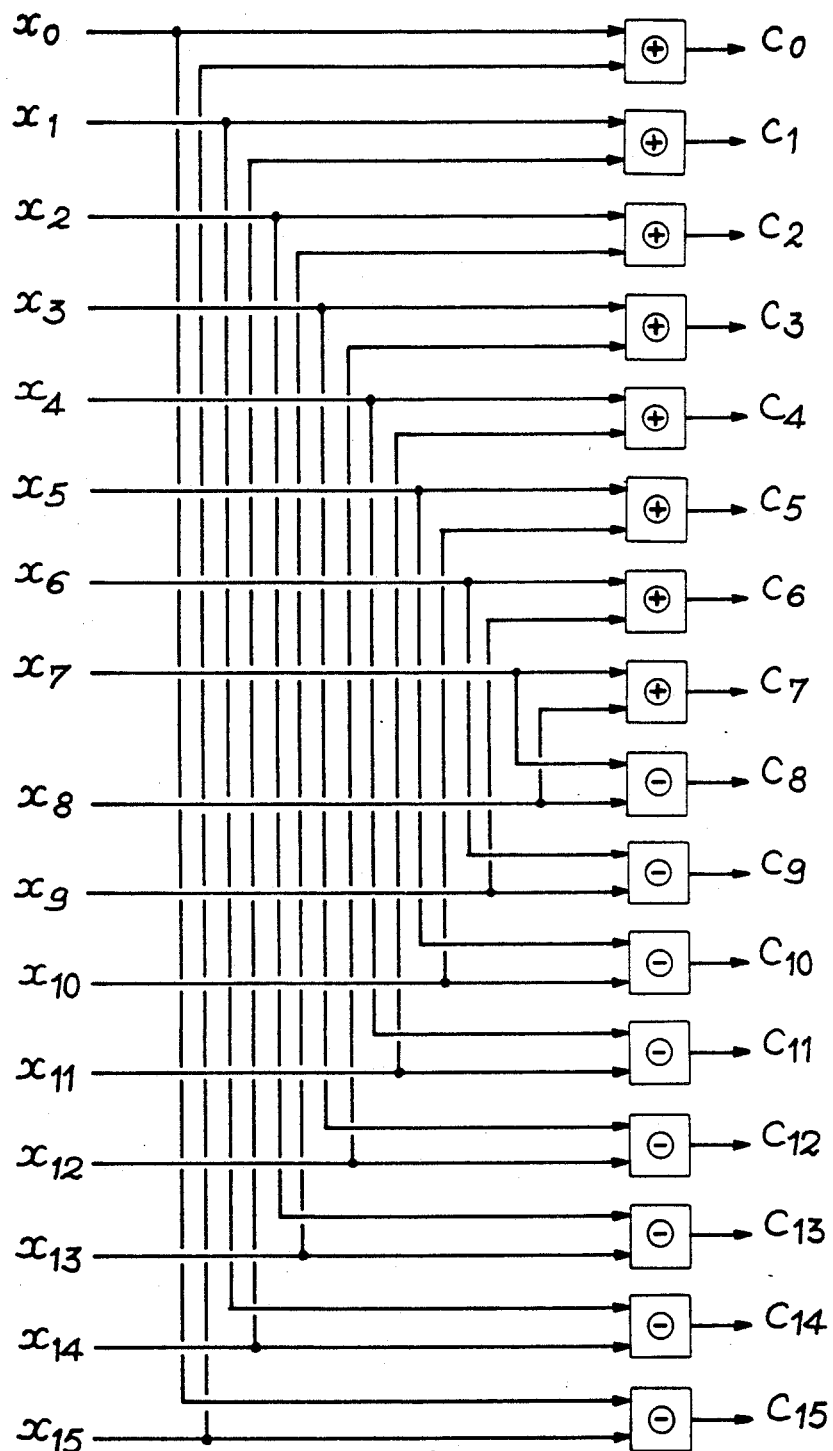
FIGS. 2a, 2b and 2c illustrate an embodiment of a circuit according to the invention for putting into practice the transformation represented in FIGS. 1a, 1b and 1c.
Figure 2:
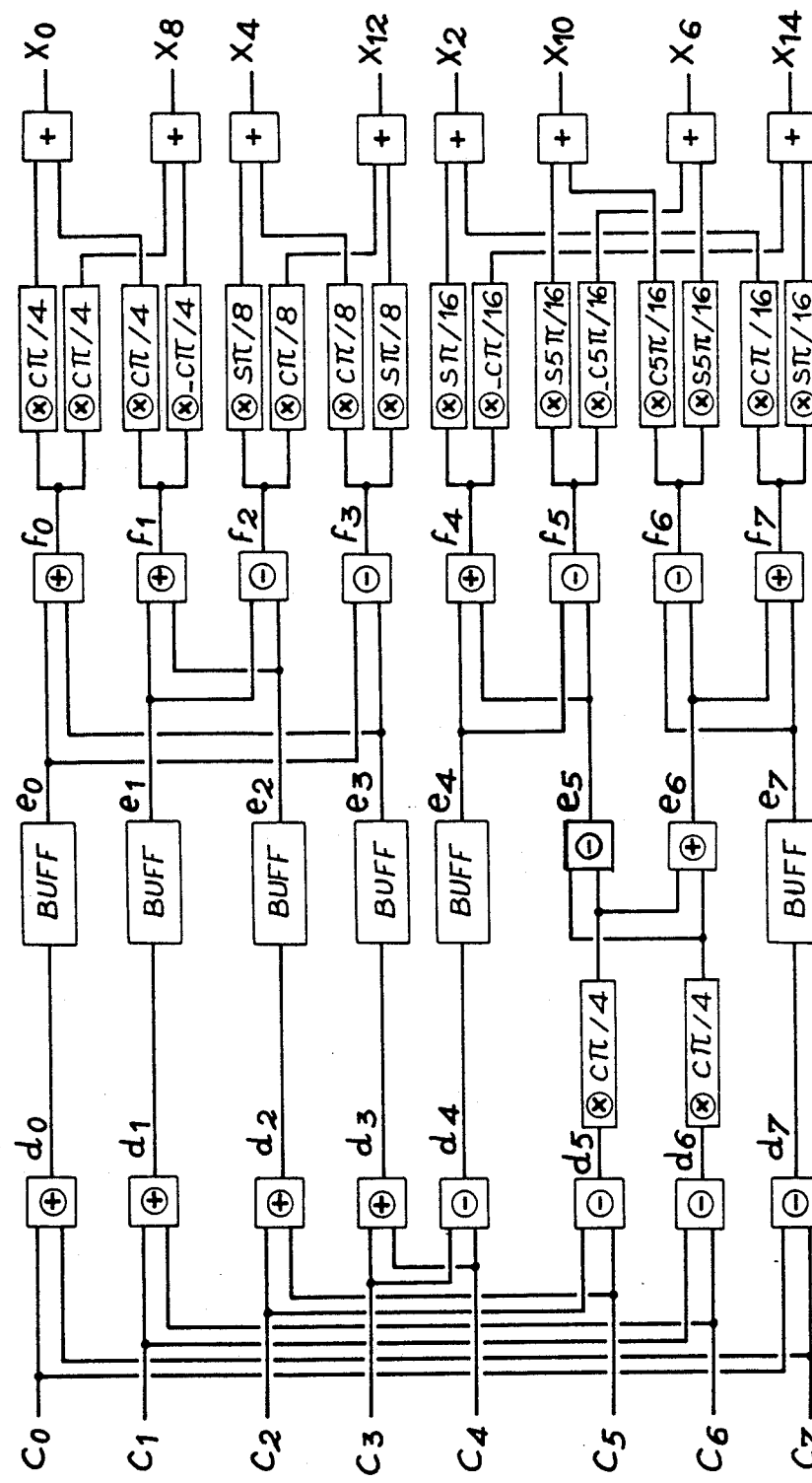
Figure 2C:
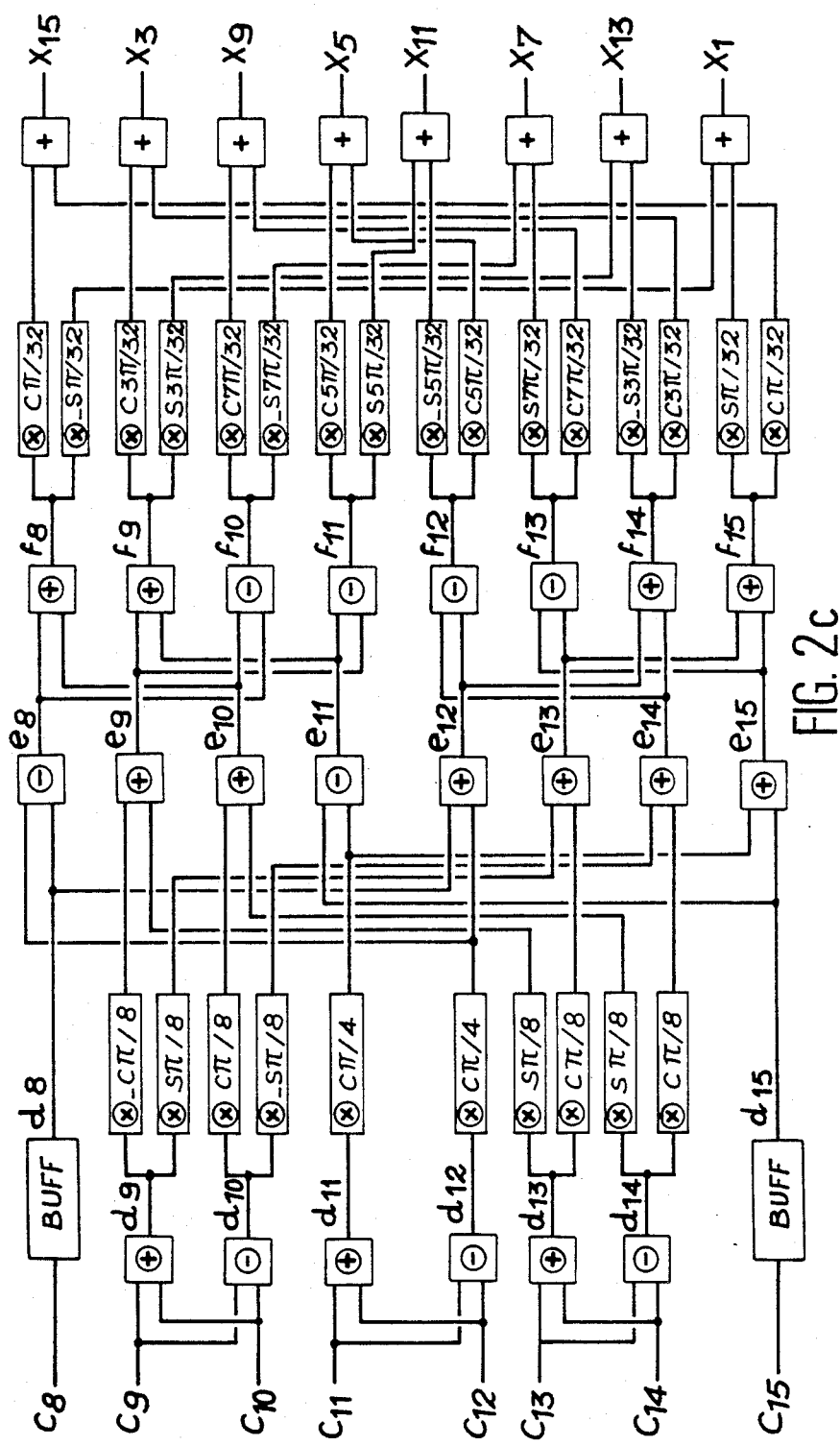

An embodiment according to the invention of a computation operator is represented in FIGS. 2a, 2b and 2c. In this embodiment, each operator comprises 44 multipliers of the parallel-series type and 72 adders of the series type. For each multiplier, the multiplying coefficient applied to the data received as input has been indicated. For each adder, the nature of the operation —addition or subtraction —has been specified by the the signs "+" and "−". In the case of a subtraction, the operand applied to the lower input of the subtracting device is subtracted from the one applied to its upper input.

The parallel-series multipliers work with multipliers coded in 2's complement code and are delivered with the least significant bit (LSB) at the head. For each multiplier, the multiplicand which represents a cosine or sine coefficient is positive and wired to an adder of the modified "Manchester Carry Chain" type, to take into account the fact that this multiplicand is fixed.

Besides the computing operator itself, each multiplier comprises an accumulation and shift register, and a buffer register to deliver the data bit by bit to the following computing stage in the graph. This register of the parallel-series type further comprises an inverter making it possible to provide the result to the following stage with the appropriate sign.

The adders are of the series type and work also on operands coded in 2's complement code. Each adder is wired so as to perform, between the two operands, the desired addition or subtraction operation.

Additional buffer registers BUFF can be used to keep the data which is unchanged between two nodes.

According to the invention, and addition or multiplication operator is associated with each node or each branch of the graph. In practice, it is sometimes possible to simplify slightly the circuit associated with the graph.

For example, in FIG. 1b, two branches associated with the same multiplicative coefficient $\cos(\pi/4)$ proceed from the same node $d_6$. Of course, it is useless to provide two identical multipliers for the same node. Therefore, in FIG. 2b a single multiplier receiving the signal from node $d_6$ has been provided, the result of the multiplication being transmitted simultaneously to the adders corresponding to nodes $e_5$ and $e_6$.

The procedure was the same for the branches coming from node $d_5$. However, in this case, the multiplicative coefficient is equal to $+\cos(\pi/4)$ for one branch and to $-\cos(\pi/4)$ for the other branch. The multiplier used has a multiplicative coefficient of $\cos(\pi/4)$; the minus sign which must be added for the branch going from $d_5$ to $e_5$ is restored by replacing the adder with a subtracting device at $e_5$.

Moreover, it is noted that it is possible to make in any circuit only multipliers having a positive multiplication coefficient, the possible sign of this coefficient being taken into account during the addition/subtraction operation which follows.

The applicant has made an integrated circuit for the discrete cosine transform described above. This circuit comprises 80,000 transistors on a 49 mm² chip. This circuit is made in a 2 micron CMOS technology with two metallization levels. The discrete cosine transform of a block of 16×16 pixels, each coded on 8 bits, is achieved in real time at a frequency of 16 megahertz and with an internal precision of the computations on 14 bits.

We claim:

1. A circuit for performing a linear transformation on a digital signal composed of N samples, wherein N is an integer, said circuit comprising:

a first plurality of successive operator stages wherein each of said stages performs addition and subtraction operations by means of associated adders according to a determined linear transformation graph, a second plurality of operator stages which perform multiplication operations by means of associated multipliers according to said graph, each stage of multiplication being between two stages of addition/subtraction;

buffers between two successive stages of addition/subtraction;

said graph including a third plurality of stages equal in number to said first plurality of successive stages of said circuit and wherein said graph further includes a plurality of branches wherein each branch represents an operation of multiplication by one of said associated multipliers between a variable operand and a determined coefficient and wherein said graph further comprises a plurality of nodes with each node representing an operation of addition or subtraction by one of said associated adders between two variable operands, the multiplier associated with each one of said branches being wired according to the value of said determined coefficient associated with said branch, the adder for each of said plurality of nodes being wired according to one of the addition operation and the subtraction operation associated with said node.

2. The circuit according to claim 1 wherein said circuit is an integrated circuit.

3. The circuit according to claim 1, further including a plurality of said buffers wherein each one of said plurality of buffers is associated with one of said branches to store the variable operand transmitted to a first node where each one of said branches originates and to a second node where said each one of said branches ends so that data is unchanged between said first and second node.

* * * * *